United States Patent

Poetsch

[11] 4,051,511
[45] Sept. 27, 1977

[54] SYSTEM FOR AUTOMATIC COLOR BALANCE CORRECTION

[75] Inventor: Dieter Poetsch, Ober Ramstadt, Germany

[73] Assignee: Robert Bosch G.m.b.H., Stuttgart, Germany

[21] Appl. No.: 726,144

[22] Filed: Sept. 24, 1976

Related U.S. Application Data

[63] Continuation-in-part of Ser. No. 620,409, Oct. 7, 1975.

[30] Foreign Application Priority Data

Sept. 11, 1974 Germany .............................. 2448505
Sept. 27, 1975 Germany .............................. 2543236

[51] Int. Cl.² ............................................. H04N 9/535
[52] U.S. Cl. ................................................. 358/29
[58] Field of Search ............................... 358/29, 28

[56] References Cited

U.S. PATENT DOCUMENTS

| 3,562,410 | 2/1971 | Lovely | 358/29 |
| 3,627,911 | 12/1971 | Kubota et al. | 358/29 |
| 3,735,026 | 5/1973 | Smith et al. | 358/29 |

*Primary Examiner*—Richard Murray
*Assistant Examiner*—Mitchell Saffian
*Attorney, Agent, or Firm*—Littlepage, Quaintance, Murphy, Richardson & Webner

[57] ABSTRACT

Color balance of a color television picture is corrected during those periods when the luminosity falls within prespecified limits and when simultaneously the chroma-saturation is below a prespecified level. A switch operates to change the time constant of an integrator for derivation of a control signal indicative of when the simultaneous conditions are met. One time constant is used when the simultaneous conditions begin and another when they end, thereby allowing better correction of color stains which do not extend uniformly over the entire picture.

4 Claims, 1 Drawing Figure

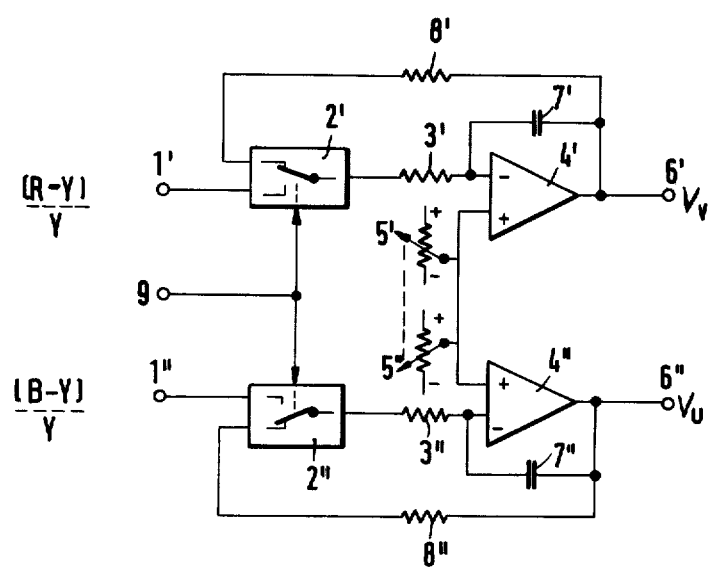

SYSTEM FOR AUTOMATIC COLOR BALANCE CORRECTION

CROSS-REFERENCE TO RELATED APPLICATION

This application is a continuation-in-part of U.S. patent application number 620,409, filed Oct. 7, 1975, which is incorporated herein by reference.

BACKGROUND OF THE INVENTION

1. Field of the Invention

The invention relates to a system for automatic correction of the color balance of the signals which control color and luminosity of color television picture. In this system, when a prespecified luminosity gradation in the color television picture is detected and when at the same time the chroma-saturation drops or remains below a prespecified chroma-saturation threshold, a hue of the television picture prevailing at this moment is stored. A function of the stored hue is used to derive control signals which regulate a device known per se for color correction in such a way that a chromatic aberration in the color balance of the signals that control color and luminosity of a color television picture is reduced.

2. Description of the Prior Art

It has been observed that certain picture patterns afflicted with a color stain are faultily corrected in the system disclosed in my prior application U.S. Ser. No. 620,409, filed Oct. 7, 1975. In such picture patterns, the color stain is not uniformly distributed over the picture surface. In some picture areas, the chroma-saturation of the color stain is above the set threshold of a chroma-saturation threshold detector, and in other picture areas below this threshold. According to the main patent the color correction would first operate in the picture areas wherein the chroma-saturation is below the set chroma-saturation threshold. Thus, the previously more strongly saturated picture areas would be brought into the lower chroma-saturation threshold area. More strongly saturated colors in the picture pattern would therefore be undesiredly corrected and desaturated in color.

SUMMARY OF THE INVENTION

The present invention therefore relates to a system of the initially indicated type which does not lead to faulty color corrections in the aforementioned certain picture patterns.

The system of the invention has the advantage that in certain picture-pattern correction errors can no longer gradually accumulate.

BRIEF DESCRIPTION OF THE DRAWING

Further details and advantages are described in detail in the following with the aid of an embodiment of the system of the invention with one FIGURE. The FIGURE shows a circuit arrangement according to the system of the invention.

DESCRIPTION OF THE PREFERRED EMBODIMENT

The FIGURE shows two separate channels for the derivation of a control signal from respective color difference signals. In the present embodiment it will be assumed that the color difference signals are standardized. Through a terminal 1' the standardized color difference signal (R − Y/Y) is fed to a contact of a controlled switch 2'. The contact path of controlled switch 2' is connected by way of a resistor 3' to the inverse input of a sum-and-difference amplifier 4'. The non-inverse input of sum-and-difference amplifier 4' is connected to a direct voltage adjustable by means of a potentiometer 5', which direct voltage serves to adjust the command variable between the two control signals. The output of sum-and-difference amplifier 4' is connected with a terminal 6', by way of a capacitor 7', to the inverse input. Furthermore, the output of the sum-and-difference amplifier 4' is connected by way of a resistor 8' to another contact of controlled switch 2'. The circuit arrangement of the second channel corresponds to that of the first channel, but the standardized color difference signal (B − Y/Y) is connected to terminal 1".

The circuit arrangement operates as follows: When a prespecified luminosity gradation, for example, a medium luminosity gradation, is detected, and when the chroma-saturation ranges below a prespecified chroma-saturation threshold in the television picture, the contact path of controlled switch 2' is switched, by means of a characteristic signal connected to switching terminal 9, to terminal 1'. The standardized color difference signal connected to terminal 1' is integrated up by series-connected integration circuit 3', 7' and 4'. At the output of this integration circuit to terminal 6', a control signal $V_V$ can be obtained which is fed to the adjustment input of a color corrector (not illustrated). When, for example, a medium luminosity gradation is prespecified and when a gradation of black or white luminosity is detected, or when the prespecified chroma-saturation threshold is exceeded in the television picture, the control signal connected to terminal 6' is integrated down by means of a constant potential. For this purpose the contact path of controlled switch 2' is connected to resistor 8' by means of the characteristic signal connected to terminal 9.

In this so-called down-integration it is assumed that the time constant is substantially greater in the down-integration than in the so-called up-integration of the color difference signal. The time constant $T_1$ in the up-integration is determined according to the equation $T_1 = R_3 \times C_7$, and the time constant $T_2$ in the down-integration, according to the equation $T_2 = (R_3 + R_8) \times C_7$, in which equation $R_8 > R_3$.

As initially mentioned, as a result of the down-integration, no chromatic aberration can develop in the picture patterns initially described. However, a complete chroma-aberration correction is thereby not made possible either, in the strongly saturated areas of the certain pattern. The chromatic-aberration correction amounts in the medium luminosity areas of a color television picture to only, for example, 85%. Tests have shown that an incomplete color correction disturbs less-than-possible faulty overcorrections without down-integration of the control signals.

What is claimed is:

1. In a system for automatic correction of the color balance of signals that control color and luminosity of a color television picture, in which system, when a prespecified luminosity gradation in the color television picture is detected and when at the same time the chroma-saturation is below a prespecified chroma-saturation threshold, a chromaticity of the television picture prevailing at this moment is stored, so as to derive, as a function of the stored chromaticity, control signals for regulating a color-correction device in such a way that a chromatic aberration in the color balance of the signals that control color and luminosity of a color television picture is reduced, the improvement comprising: integrator means operative at one time constant when said prespecified luminosity gradation in the color television picture is detected to up-integrate color difference signals, and operative at a different time constant when any luminosity other than said prespecified luminosity gradation is detected to down integrate in response to a different input signal.

2. System according to claim 1, further comprising in the signal path of each color difference signal a two-input one-output switch series connected with the integrator means, wherein each integrator means comprises a sum-and-difference amplifier, the inverse input of which is connected via a capacitor to the output of the amplifier, and via a first resistor to the output of the switch, and the non-inverse input of which is connected to an adjustable direct voltage and wherein the output of the amplifier is connected via a second resistor to one input of the switch, the color-difference signal being fed to the other input of the switch.

3. System according to claim 2, wherein the resistance value of the second resistor is greater than that of the first resistor.

4. System according to claim 3, wherein the one input of the switch is connected to the second resistor at the moment when any other than the prespecified luminosity gradation or a passing of the chroma-saturation above the prespecified chroma-saturation threshold is detected in the color television picture.

* * * * *